United States Patent Office 2,697,700
Patented Dec. 21, 1954

2,697,700

LOW TEMPERATURE EMULSION POLYMERIZATION IN POLYAMINE SYSTEMS CONTAINING HEAVY METAL COMPLEX ACTIVATORS

Carl A. Uraneck, Phillips, and Richard J. Sonnenfeld, Borger, Tex., assignors to Phillips Petroleum Company, a corporation of Delaware No Drawing. Application August 6, 1951,
Serial No. 240,604

6 Claims. (Cl. 260—84.1)

This invention relates to an improved process for polymerizing unsaturated organic compounds while dispersed in an aqueous emulsion. In one important aspect this invention relates to the use of faster recipes at low polymerization temperatures for effecting production of synthetic rubber by emulsion polymerization of conjugated diolefins.

Numerous recipes have been proposed for effecting emulsion polymerization reactions at low temperatures. One of the more recently developed recipes uses a polyamine as the reductant or activator and a peroxidic compound, preferably a hydroperoxide, as the initiator or oxidant. Systems of this type are generally regarded as being heavy metal-free since they contain no added heavy metal as an ingredient in the recipe. The presence of more than trace amounts of a heavy metal such as iron has been found to produce a deleterious effect on the polymerization rate. When operating with conventional polyamine recipes without the addition of a heavy metal compound, excellent polymerization rates have been realized at temperatures as low as $-10°$ C. but when the temperature is decreased further there is a noticeable slowing down of the reaction rate and in some instances the polymerization dies at a relatively low conversion.

An object of this invention is to polymerize unsaturated organic compounds.

Another object of this invention is to produce synthetic rubber.

A further object of this invention is to polymerize a monomeric material comprising a conjugated diene while dispersed in an aqueous medium.

Still another object of this invention is to effect rapid polymerization at low polymerization temperatures of monomeric materials dispersed in aqueous media.

Further objects and advantages of this invention will become apparent, to one skilled in the art, from the accompanying disclosure and discussion.

In one of its aspects this invention relates to the use of complexing agents in the production of synthetic rubber latices by emulsion polymerization at low temperatures by recipes in which an organic peroxide, a polyamine and a conventional anti-freeze are employed, in other words an organic peroxide-polyamine anti-freeze system. In conventional anti-freeze emulsion polymerization recipes in which a polyamine is used as the reductant or activator, and an organic peroxide compound as the oxidant or initiator, a greater conversion is obtained at $-10°$ C. in the absence of added heavy metals such as iron, except, of course as they might occur as impurities in other added materials. When iron, or other heavy metal, together with a complexing agent is employed at $-10°$ C. in these organic peroxide-polyamine anti-freeze systems, reactions start rapidly in most cases but die out at relatively low conversions. It would be expected that at even lower temperatures conversions would still be smaller. Quite unexpectedly, however, we have discovered that greatly improved polymerization rates can be obtained at temperatures of about $-15°$ C. and below in organic peroxide-polyamine recipes when small amounts of various heavy metal complexes are incorporated into the system. The heavy metal generally preferred is iron, which may be employed in either the ferrous or ferric state, and the complexing agent is a compound selected from the group consisting of 2,2'-dipyridyl, ethylenediamine tetra acetic acid, and alkali metal and ammonium salts of ethylenediamine tetra acetic acid. Instead of the expected retarding effect, we have discovered that these complex compounds have an activating effect at these low temperatures in addition to that produced by the polyamine itself which is regarded as an activator and reductant. Without limiting ourselves to any theory we believe that part of the iron present may be sequestered. The surprising effect of these complex heavy metal compounds in giving enhanced polymerization rates is particularly evident in the polymerization, in aqueous emulsion, of an unsaturated organic monomeric material containing an active $CH_2=C<$ group and polymerizable when dispersed in aqueous emulsion. In general said polymerization is effected in the polyamine-organic peroxide anti-freeze system, at a temperature from about $-15°$ C. to about $-40°$ C., and in the presence of (1) a small quantity not exceeding about 0.8 millimols per 100 parts monomers of a water-soluble metal salt, said metal selected from the group consisting of iron, cobalt, vanadium, manganese and copper, and (2) a small quantity of a complexing agent selected from the group consisting of 2,2'-dipyridyl, ethylenediamine tetra acetic acid and alkali metal and ammonium salts of ethylenediamine tetra acetic acid, the ratio in mols of said salt to said complexing agent being 1:1 to 1:5.

As indicated the heavy metal which is used in combination with the complexing agent is generally selected from a group of materials consisting of compounds of metals such as iron, manganese, copper, vanadium, cobalt, etc. In general it is assumed that the metal must be a multivalent metal and in such a condition that it can change its valence state reversibly. This metal is usually employed in the form of a water-soluble salt in either valence state. For example iron can be employed as the water-soluble ferrous or ferric salt, e. g. ferrous sulfate, ferric nitrate and the like. The water-soluble salt is ordinarily used in small quantities. The amount is generally expressed in millimols per 100 parts of monomeric material, using in each instance the same units of weight throughout, i. e., when the monomeric material is measured in pounds the water-soluble salt is measured in millipound mols. The same is true for other ingredients in the polymerization recipe. Usually this water-soluble heavy metal compound is employed in the range from 0.0036 to 0.72 millimols per 100 parts by weight of monomeric material. If the iron salt employed is ferrous sulfate, the quantity is in the range from 0.001 to 0.2 parts by weight per 100 parts of monomeric material.

As noted hereinbefore this invention is applicable to emulsion polymerization recipes in which the oxidant or initiator employed is an organic peroxide. The organic peroxide used as the oxidant component of the polymerization catalyst should have solubility properties such that the major portion of it is present in the liquid monomer phase, rather than in the aqueous medium, under the polymerization conditions. In general, two groups of an organic peroxide can be used, those having the formula ROOH, known as hydroperoxides or hydroperoxymethanes, and those having the formula ROOR, where R in each instance is an organic radical. These two groups are not equivalents, however, and the hydroperoxides are preferred. The preferred hydroperoxides can be represented by the formula RR'R"COOH wherein R is selected from the group consisting of hydrogen and organic radicals, and each of R' and R" is an organic radical, or R'R" together comprise a tetramethylene or pentamethylene group forming with the R-COOH a cyclopentyl- or cyclohexylhydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil-(hydrocarbon)soluble; particularly useful non-hydrocarbon substituents include oxygen in the form of hydroxy and ether compounds, sulfur in similar compounds (i. e. mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl(ethoxyphenyl)hydroperoxymethane, methyldecyl(methylphenyl)hydroperoxymethane, dimethyldecylhydroperoxymethane, methylchlorophenylphenlhydroperoxymethane, and tertiary-butylisopropylbenzene hydroperoxide(dimethyl(tertiary-butylphenyl)hydroperoxymethane). Such hydroperoxides can be easily prepared by simple oxidation, with free oxygen, of the corresponding hydrocarbon or hydrocarbon derivative, i. e. of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. This hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopropylphenyl)hydroperoxymethane.

One large group of these hydroperoxymethanes is that group in which each of the three substituent groups is a hydrocarbon radical. One of the subgroups of these compounds is the alkaryl-dialkyl hydroperoxymethanes, in which the two alkyl groups are relatively short, i. e. have from one to three or four carbon atoms each, including dimethyl(tertiary-butylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,10a-octahydrophenanthrene, which forms the corresponding hydroperoxide upon oxidation, etc. Organic peroxides and hydroperoxides preferably will have a total of not more than thirty carbon atoms per molecule, and the most active hydroperoxides usually have at least ten to twelve carbon atoms per molecule. Mixtures of these peroxides and/or hydroperoxides can be used, as desired.

Although the amount of organic peroxide used to obtain an optimum rate will depend upon such variables as the specific ingredients of the recipe employed and upon reaction conditions, an optimum rate of polymerization is usually obtained with the amount of hydroperoxide between 0.5 and 10 millimols per 100 parts by weight of monomeric material.

The polyamines contemplated, which are those normally used in emulsion polymerization recipes, are polyalkylene polyamines. A preferred polyalkylene polyamine is a polyethylene polyamine or a trimethylene polyamine. Suitable polyethylene polyamines have the general formula RNH(CHXCHXNH)$_m$(CHXCHX)$_n$NHR, where R contains not more than eight carbon atoms and is of the group consisting of hydrogen, alkyl, cycloalkyl, aromatic, olefinic, and cycle-olefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of such polyethylene polyamines include ethylene diamine, hydrazine, diethylenetriamine, tetraethylenepentamine, dipropylenetriamine, 2-methyl-3-azapentane-1,5-diamine, N-(2-hydroxy-ethyl)-1,2-ethanediamine, N-phenylethylenediamine, N-cyclohexyl-N'-(2-aminoethyl)-1,2-ethanediamine, N'-(2-hydroxy-tertiary-butyl)-1,2-propylenediamine, carbamates of the foregoing, and the like.

Suitable trimethylene polyamines are preferably those having the general formula

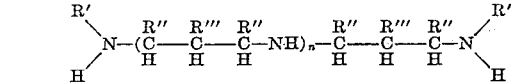

where each R' is one of the group consisting of hydrogen, methyl, ethyl, hydroxymethyl, hydroxyethyl, and carboxy radicals, each R'' is hydrogen or methyl, and each R''' is hydrogen, methyl, or an activating substituent of the group consisting of —OR, —SR, —NR$_2$, —CN, —SCN, —COOR, —CHO, with R being hydrogen, methyl, ethyl, n-propyl, or isopropyl, or —CHR''' can be >C=O, and $n$ is an integer between 0 and 8 inclusive. The compounds containing a single trimethylene group together with its two terminal amine groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example tri(trimethylene)-tetramine (sometimes erroneously designated as tripropylenetetramine) is considered to be a polymer of trimethylenediamine. All of the polyamino compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines". It is preferred to use only those polyamines which come within the structural formula defined hereinabove, and all of the compounds so defined are operable in our process to some extent though it will of course be appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by the way of example the following are mentioned: 1,3-diaminopropane, 1,3-diaminoacetone, 1,3-diamino-2-propanol, N,N'-dimethyl-1,3-diaminoacetone, N-ethoxy-1,3-diamino-2-propanol, 1,3-diamino-2-carboxypropane, 1,3-diamino-2-(dimethyl-amino)-propane, 2,4-diaminopentane, 1,3-diamino-2-cyanopropane, 1,3-diamino-2-mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

The amount of polyalkylene polyamine to be used in any particular case depends upon such variables as the polyamine used, specific ingredients of the recipe, and conditions of reaction. The amount of polyamino compound will usually be in the range from 0.5 to 20 millimols per 100 parts by weight of monomeric material.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3- butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The present invention is directed primarily to the production of polymers, of conjugated dienes, which have physical properties classifying them as synthetic rubber, and the invention is particularly applicable to the polymerization of hydrocarbon or substituted hydrocarbons monomeric materials. Such materials include 1,3-butadiene and other conjugated diolefin hydrocarbons having not more than six carbon atoms per molecule, halogen derivatives, such as chloroprene, fluoroprene, and the like, either alone, in admixture with each other, or together with minor amounts of unsaturated compounds which are copolymerizable therewith in aqueous emulsion, such as styrene, alpha methylstyrene, vinyltoluene, chlorostyrene, etc. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.15:1 and about 2.75:1, in parts by weight. Inasmuch as the temperatures employed within the scope of this invention range from about —15° C. to about —40° C. or lower, it is necessary to include water-soluble components in the aqueous phase to prevent freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low boiling alcohol such as methanol is easily removed and frequently preferred. Other aliphatic alcohols of higher boiling point than methanol, such as a propanol, are frequently less satisfactory. In the practice of the invention suitable means will be necessary to establish and maintain an emulsion and to remove reaction heat to maintain a desired reaction temperature. The polymerization can be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

In preparing synthetic rubber by polymerizing conjugated dienes by the process of this invention it is usually desirable to use a polymerization modifying agent, as is usually employed in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

One of the advantages of the polymerization recipes, as disclosed herein, is that they are applicable for use in the production of "high solids" latices, i. e., latices resulting from the use of a smaller amount of aqueous medium than is generally used in conventional polymerization procedures. For this type of operation the ratio of aqueous phase to monomeric material will generally be in the range from 0.15:1 to 1:1 and the extent of conversion will generally range from 70 per cent to substantially complete conversion.

Emulsifying agents which are applicable in these low temperature polymerizations are materials such as potassium laurate, potassium oleate, and the like, and salts of rosin acids, either alone or in admixture with each other. However, other emulsifying agents, such as non-ionic emulsifying agents, salts of alkyl aromatic sulfonic acids, alkyl sulfates, and the like which will produce favorable results under the conditions of the reactions, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH may be within the range from 9 to 12 and it may be advantageous to have a pH higher than 12 in some instances. In most cases optimum results are obtained if the pH is 10 or higher.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex. Generally the amount of such salt will not exceed one part per 100 parts of monomers. The salt employed as the electrolyte can also function as the antifreeze compound. Of course larger quantities are used where the salt is additionally employed as an anti-freeze agent.

In order to determine the effect of iron combined with a complexing agent in a polyamine activated polymerization system at $-10°$ C., a series of runs was made using a recipe appropriate to this higher temperature and a mixed emulsifier which has been shown to be operable at $-20°$ C. The complexing agents employed in the recipes disclosed hereinafter were 2,2'-dipyridyl, and the tetra sodium salt of ethylenediamine tetra acetic acid which can be represented by the following formula:

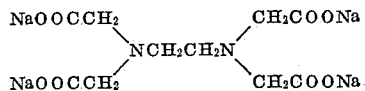

This salt can be employed in crystalline form or in an aqueous solution. The tetra sodium salt of ethylenediamine tetra acetic acid will be referred to as "complexing agent 1" in the recipes to be disclosed. The following example demonstrates the effect of iron and complexing agent 1 in a polyamine activated anti-freeze polymerization system at $-10°$ C.

*Example 1*

| | Parts by weight |
|---|---|
| Butadiene | 70 |
| Styrene | 30 |
| Water | 180 |
| Methanol | 45 |
| Rosin soap, K salt [1] | 3.5 |
| Mixture of fatty acid soaps [2] | 1.5 |
| KCl | 0.25 |
| Mercaptan blend [3] | 0.25 |
| Tert-butylisopropylbenzene hydroperoxide | 0.104 (0.5 millimol) |
| Tetraethylenepentamine | 0.19 (1.0 millimol) |
| Complexing agent 1 | variable |
| FeSO$_4$.7H$_2$O | variable |
| Fe(NO$_3$)$_3$.9H$_2$O | variable |

[1] Dresinate 214.
[2] Potassium Office of Rubber Reserve Soap.
[3] A blend of tertiary C$_{12}$, C$_{14}$, and C$_{16}$ aliphatic mercaptans in the ratio of 3:1:1 parts by weight.

The results are shown below:

| Complexing Agent 1 | FeSO$_4$.7H$_2$O, Part | Fe(NO$_3$)$_3$.9H$_2$O, Part | Conversion, Percent | | |
|---|---|---|---|---|---|
| | | | 4 hours | 7 hours | 24 hours |
| | | | 5 | 13 | 70 |
| 0.0028 | 0.001 | | 13 | 29 | 52 |
| 0.014 | 0.005 | | 23 | 36 | 43 |
| 0.028 | 0.01 | | 20 | 32 | 39 |
| 0.14 | 0.05 | | 28 | 30 | 30 |
| 0.28 | 0.1 | | 15 | 15 | 14 |
| 0.70 | 0.25 | | 2 | 2 | 2 |
| 0.028 | | 0.0145 | 18 | 28 | 45 |
| 0.028 | | | 0 | 3 | 29 |
| 0.028 | 0.01 [1] | | 0 | 0 | 0 |
| | 0.01 | | 9 | 9 | 9 |

[1] No tetraethylenepentamine was employed in this run.

Example 1 shows that in the absence of any added iron and/or complexing agent 1 at the end of twenty-four hours a higher conversion resulted than when iron and/or the complexing agent were added. In the runs containing iron and complexing agent 1 the reactions started rapidly in most cases but had a tendency to die at relatively low conversion. Thus, at $-10°$ C. the complex iron compounds exert a retarding effect on the polymerization rate and better results are obtained when only the polyamine is used as the activator. However, contrary to expectations at temperatures of $-15°$ C. and below, this activator system gives enhanced polymerization rates over a system which contains a polyamine as the activator ingredient but no iron complex compounds.

The following examples clearly show this unexpected effect. These examples, of course are illustrative since modifications, particularly in the recipes, will be obvious to one skilled in the art.

*Example 2*

The following recipe was employed for effecting a butadiene-styrene copolymerization at $-20°$ C.:

| | Parts by weight |
|---|---|
| Butadiene | 70 |
| Styrene | 30 |
| Water | 187.5 |
| Methanol | 62.5 |
| Potassium oleate (KOH to adjust pH to 11.7) | 5.0 |
| Mercaptan blend [1] | 0.25 |
| Tert-butylisopropylbenzene hydroperoxide | 0.208 (1.0 millimol) |
| Tetraethylenepentamine | 0.378 (2.0 millimol) |
| FeSO$_4$.7H$_2$O | 0.01 |
| Complexing agent 1 [2] | 0.028 |
| or | |
| 2,2'-dipyridyl | 0.017 |
| KCl | 0.25 |

[1] A blend of tertiary C$_{12}$, C$_{14}$, and C$_{16}$ aliphatic mercaptans in a ratio of 3:1:1 parts by weight.
[2] Tetra sodium salt of ethylenediaminetetra acetic acid.

A control was run in the absence of iron and complexing agent 1 or 2,2'dipyridyl. Two other runs were made without iron, one containing complexing agent 1 and the other containing 2,2'dipyridyl. The following results were obtained:

| FeSO$_4$.7H$_2$O, Part | Iron Complexing Agent | | Mol Ratio, Fe/Comp. Agent | Conversion, Percent | |
|---|---|---|---|---|---|
| | Type | Part | | 15 hours | 20 hours |
| | | | | 30 | 38 |
| 0.01 | 2,2'-Dipyridyl | 0.017 | ¼ | 37 | 51 |
| 0.01 | Complexing Agent 1 | 0.028 | ½ | 59 | 72 |
| | 2,2'-Dipyridyl | 0.017 | | 26 | 35 |
| | Complexing Agent 1 | 0.028 | | 5 | 9 |

*Example 3*

A series of polymerization runs was made at $-20°$ C. using an amine-activated system similar to that given in Example 2 in which complexing agent 1 was employed with both ferrous and ferric iron. Runs were also made with iron in the absence of complexing agent 1 and with complexing agent 1 in the absence of iron. The basic formulation was as follows:

| | Parts by weight |
|---|---|
| Butadiene | 70 |
| Styrene | 30 |
| Water | 187.5 |
| Methanol | 62.5 |
| Rosin soap, potassium [1] | 3.5 |
| Mixture of fatty acid soaps [2] (pH soap solution 11.7) | 1.5 |
| Mercaptan blend [3] | 0.25 |
| Tert-butylisopropylbenzene hydroperoxide | 0.208 (1.0 millimol) |
| Tetraethylenepentamine | 0.378 (2.0 millimol) |
| FeSO$_4$.7H$_2$O | 0.01 or none |
| Fe(NO$_3$)$_3$.9H$_2$O | 0.0145 or none |
| Complexing agent 1 | 0.028 or none |
| KCl | 0.2 |

[1] Dresinate 214.
[2] Potassium Office of Rubber Reserve Soap.
[3] As in Example 2.

The following tabulation shows the materials used in each run and the time conversion data:

| $FeSO_4 \cdot 7H_2O$, Part | Complexing Agent 1 | Tetraethylene-pentamine, Part | $Fe(NO_3)_3 \cdot 9H_2O$, Part | Conversion, Percent | | | |
|---|---|---|---|---|---|---|---|
| | | | | 4 hours | 18 hours | 23.5 hours | 36 hours |
| ------ | ------ | 0.378 | ------ | 0 | 7 | 12 | -- |
| 0.01 | ------ | 0.378 | ------ | 6 | 10 | 10 | -- |
| ------ | 0.028 | 0.378 | ------ | 0 | 1 | 4 | -- |
| 0.01 | 0.028 | 0.378 | ------ | 0 | 32 | 46 | 71 |
| 0.01 | 0.028 | ------ | ------ | 0 | 0 | 0 | -- |
| ------ | 0.028 | ------ | ------ | 0 | 0 | 0 | -- |
| ------ | ------ | 0.378 | 0.0145 | 6 | 13 | 12 | -- |
| ------ | 0.028 | 0.378 | 0.0145 | 0 | 34 | 48 | 69 |
| ------ | 0.028 | ------ | 0.0145 | 0 | 0 | 0 | -- |

*Example 4*

Variable amounts of ferrous sulfate and complexing agent 1 were employed in the recipe of Example 3. The polymerization temperature was −20° C. The following results were obtained:

| $FeSO_4 \cdot 7H_2O$, Part | Complexing Agent 1 | Conversion, Percent | | |
|---|---|---|---|---|
| | | 5 hours | 9 hours | 23 hours |
| ------ | 0.0028 | 0 | 2 | 12 |
| 0.001 | 0.014 | 1 | 5 | 28 |
| 0.005 | 0.028 | 5 | 12 | 50 |
| 0.01 | 0.14 | 6 | 16 | 57 |
| 0.05 | 0.28 | 22 | 39 | 61 |
| 0.1 | 0.70 | 22 | 37 | 57 |
| 0.25 | | 0 | 0 | 0 |

*Example 5*

Various emulsifiers (either 5 or 6 parts) were employed for effecting a series of polymerizations at −20° C. using the recipe given in Example 2 with 0.028 part complexing agent 1 and 0.01 part $FeSO_4 \cdot 7H_2O$. The following results were obtained:

| Soap, Parts | Conversion, Percent | | |
|---|---|---|---|
| | 3 Hours | 9 Hours | 23 Hours |
| K Myristate, 3 | 13 | 40 | 85 |
| K laurate, 3 | | | |
| K oleate, 5 | 14 | 38 | 79 |
| Dresinate 214, 3.5 | 5 | 21 | 63 |
| K-ORR soap, 1.5 | | | |

Three additional soap mixtures, Dresinate 214 with K-ORR soap (potassium Office Rubber Reserve soap), were used in another series of runs using the same polymerization recipe. The results were as follows:

| Soap, Parts | Conversion, Percent | | | |
|---|---|---|---|---|
| | 4 Hours | 18 Hours | 23.5 Hours | 36 Hours |
| Dres. 214, 2.8 / K-ORR soap, 1.2 | 0 | 30 | 43 | 73 |
| Dres. 214, 2.1 / K-ORR soap, 0.9 | 0 | 19 | 29 | 64 |
| Dres. 214, 1.788 / K-ORR soap, 1.212 | 0 | 25 | 37 | 71 |

*Example 6*

Three different oxidants were employed in the recipe of Example 3 for carrying out a series of polymerizations at −20° C., using 0.028 part complexing agent 1, 0.01 part $FeSO_4 \cdot 7H_2O$, and 0.25 part KCl, instead of 0.2 part. The following polymerization data were obtained using one millimol oxidant in each run:

| Oxidant | Conversion, Percent | | |
|---|---|---|---|
| | 4.5 Hours | 9.5 Hours | 23.5 Hours |
| Tert-butylisopropylbenzene hydroperoxide | 5 | 17 | 56 |
| Tert-amylisopropylbenzene hydroperoxide | 12 | 26 | 69 |
| Cumene hydroperoxide | 0 | 5 | 20 |

*Example 7*

Variable amounts of tert-hexadecyl mercaptans were employed as the modifier when carrying out a series of polymerizations at −20° C. using the following recipe:

|  | Parts by weight |
|---|---|
| Butadiene | 70 |
| Styrene | 30 |
| Water | 187.5 |
| Methanol | 62.5 |
| Rosin soap, K salt [1] | 1.788 |
| Potassium Office Rubber Reserve soap (pH of soap solution 11.7) | 1.212 |
| Tert-hexadecyl mercaptan | variable |
| Tert - butylisopropylbenzene hydroperoxide | 0.208 (1 millimol) |
| $FeSO_4 \cdot 7H_2O$ | 0.01 |
| Tetraethylenepentamine | 0.378 (2 millimols) |
| Complexing agent 1 | 0.028 |
| Potassium chloride | 0.2 |

[1] Dresinate 214.

The following tabulation shows the amounts of mercaptan used, the time-conversion data, and the Mooney values of the polymers:

| Mercaptan, Part | Conversion | | Mooney, ML-4 |
|---|---|---|---|
| | Time, Hours | Percent | |
| 0.3 | 24 | 59 | 71 |
| 0.45 | 28.8 | 62 | 38 |
| 0.5 | 35 | 65 | 30 |

The data in the foregoing examples show that iron, in combination with 2,2′dipyridyl or the tetra sodium salt of ethylenediamine tetra acetic acid (complexing agent 1) and tetraethylenepentamine, is very suitable for accelerating emulsion polymerizations at −20° C. in polyamine organic peroxide anti-freeze systems. Polymerization rates much more rapid than those obtained when the polyamine alone is used, are obtained at −20° C. in these anti-freeze systems in which an iron complex compound and a polyamine are employed. Obviously many modifications or variations of the invention as hereinbefore set forth may be made without departing from the spirit and scope thereof and, therefore, only such limitations should be imposed as are indicated in the appended claims.

We claim:
1. A process for producing synthetic rubber latices which comprises polymerizing a major amount of 1,3-butadiene and a minor amount of styrene in aqueous emulsion, said polymerization being effected in a polyamine organic peroxide anti-freeze system, at a temperature from —15° C. to —40° C., and in the presence of (1) from 0.0036 to 0.72 millimols per 100 parts monomers of a water-soluble metal salt, said metal selected from the group consisting of iron, cobalt, vanadium, manganese and copper, and (2) a small quantity of a complexing agent selected from the group consisting of 2,2'-dipyridyl, ethylenediamine tetra acetic acid and alkali metal and ammonium salts of ethylenediaminetetra acetic acid, the ratio in mols of said salt to said complexing agent being 1:1 to 1:5.

2. A process of producing synthetic rubber latices which comprises polymerizing a major amount of 1,3-butadiene and a minor amount of styrene in aqueous emulsion, said polymerization being effected in a polyamine-organic peroxide anti-freeze system, at a temperature from —15° C. to —40° C., and in the presence of from 0.0036 to 0.72 millimols per 100 parts monomers of a water-soluble iron salt, and a small quantity of a complexing agent selected from the group consisting of 2,2'-dipyridyl, ethylenediamine tetra acetic acid and alkali metal and ammonium salts of ethylenediamine tetra acetic acid, the ratio of said salt to said complexing agent in mols being 1:1 to 1:5.

3. A process of producing synthetic rubber latices which comprises polymerizing a major amount of 1,3-butadiene and a minor amount of styrene in aqueous emulsion, said polymerization being effected in an organic peroxide-polyalkylene polyamine anti-freeze system, at a temperature of from —15° C. to —40° C., and in the presence of from 0.0036 to 0.72 millimols per 100 parts monomers of a water-soluble iron salt and as a complexing agent ethylenediamine tetra acetic acid, the ratio in mols of the iron salt to the complexing agent being 1:1 to 1:5.

4. A process of producing synthetic rubber latices which comprises polymerizing a major amount of 1,3-butadiene and a minor amount of styrene in aqueous emulsion, said polymerization being effected in an organic peroxide-polyalkylene polyamine anti-freeze system, at a temperature of from —15° C. to —40° C., and in the presence of from 0.0036 to 0.72 millimols per 100 parts monomers of a water-soluble iron salt and an amount of from 0.0074 to 1.5 millimols per 100 parts monomers of 2,2'-dipyridyl as a complexing agent, the ratio in mols of the iron salt to the complexing agent being 1:1 to 1:5.

5. A process of producing synthetic rubber latices which comprises polymerizing a major amount of 1,3-butadiene and a minor amount of styrene in aqueous emulsion, said polymerization being conducted at a temperature of from —15° C. to —40° C. in the presence of from 0.1 to 10 millimols per 100 parts monomers of an organic peroxide, 0.02 to 5 parts per 100 parts monomers of a polyalkylene polyamine, an amount of anti-freeze sufficient to prevent freezing, an amount of from 0.0036 to 0.72 millimols per 100 parts monomer of a water-soluble iron salt and, as a complexing agent, an alkali metal salt of ethylenediamine tetra acetic acid, the ratio in mols of said iron salt to said complexing agent being 1:1 to 1:5.

6. A process of producing synthetic rubber latices which comprises polymerizing a major amount of 1,3-butadiene and a minor amount of styrene in aqueous emulsion, said polymerization being conducted at a temperature of from —15° C. to —40° C., and in the presence of from 0.1 to 10 millimols per 100 parts monomers of cumene hydroperoxide, from 0.02 to 5 parts per 100 parts monomers of tetraethylene pentamine, an amount of anti-freeze sufficient to prevent freezing, an amount of from 0.0036 to 0.72 millimols per 100 parts monomers of a water-soluble iron salt and, as a complexing agent, from 0.0074 to 1.5 millimols per 100 parts monomers of the tetra sodium salt of ethylenediamine tetra acetic acid, the ratio in mols of said iron salt to said complexing agent being 1:1 to 1:5.

References Cited in the file of this patent

UNITED STATES PATENTS

| Number | Name | Date |
|---|---|---|
| 2,560,741 | Provost | July 17, 1951 |

OTHER REFERENCES

Shearon et al. Ind. & Eng. Chem., vol. 40, No. 5, May 1948, pgs. 769–777.

Mitchell et al. Ind. & Eng. Chem., vol. 40, No. 8, August 1949, pgs. 1592–1598.

Johnson et al. Ind. & Eng. Chem., vol. 41, No. 8, August 1949, pgs. 1577–1580.